United States Patent [19]
Rumph et al.

[11] Patent Number: 6,034,700
[45] Date of Patent: Mar. 7, 2000

[54] EFFICIENT RUN-BASED ANTI-ALIASING

[75] Inventors: David E. Rumph, Pasadena, Calif.;
Eric S. Nickell, Quezon, Philippines

[73] Assignee: Xerox Corporation, Stamford, Conn.

[21] Appl. No.: 09/012,651

[22] Filed: Jan. 23, 1998

[51] Int. Cl.$^7$ .................................................. G06T 11/00
[52] U.S. Cl. ......................... 345/441; 382/245; 345/136;
345/428; 340/815.65
[58] Field of Search .................................... 382/269, 268,
382/245, 266; 345/136, 138, 147, 150,
431, 432, 441, 443, 12, 20, 22, 63, 72,
77, 83, 88, 89, 426, 428; 340/815.65

*Primary Examiner*—Mark R. Powell
*Assistant Examiner*—Lance W. Sealey
*Attorney, Agent, or Firm*—Robert Cunha

[57] ABSTRACT

A simple method of anti-aliasing for edges near the fast scan direction is to replace the pixels on both sides of the transition in a scan with pixels of varying intermediate color. Thus, if there is an edge between red and blue areas, instead of there being an abrupt change from red to blue at the edge, there will be a number of pixels that slowly vary from mostly red to mostly blue, which will tend to make the jagged edge less obvious.

6 Claims, 5 Drawing Sheets

Н6,034,700

EFFICIENT RUN-BASED ANTI-ALIASING

BACKGROUND OF THE INVENTION

A system for reducing the amount of jaggedness (anti-aliasing) of the edges of text or synthetic graphics that are angularly close to the horizontal (fast scan direction) by using the different run boundaries in a run length encoding of the compressed text or graphic to generate edge pixels that are intermediate shades of gray.

Text or graphical data is normally transmitted or stored in a Page Description Language (such as Adobe's PostScript) using a mathematical representation that is not correlated to the characteristics of a particular output device such as a raster display or laser printer. To actually display or print the text or graphical data, it must be converted to rasters suitable for the output device. The resolution of the display or printer will then have a fixed number of picture elements ("pixels") per square inch, see FIG. 1. Because the output device has a fixed resolution, the mathematically defined ideal shape 10 of the text or graphic must be approximated, 11. When the edge of the text or graphic's definition does not call for it to be exactly straight and aligned either vertically or horizontally with the output rasters, a stair stepped, or jagged edge will result. If the output device's resolution is low, these "jaggies" will be visible and objectionable. This situation, showing both the ideal shape and the approximation made by rasterizing at a particular resolution, is illustrated in FIG. 1.

Increasing the resolution in both direction increases the cost of the apparatus, sometimes by order $O(n^2)$. One approach in the prior art is to increase the resolution only in the fast-scan direction, see FIG. 2. Sometimes called "high-addressability," this approach takes advantage of the fact that in many cases, the rasterization process converts the mathematical shape 12 first to a run-length encoded form before producing discrete pixels 13. Thus increasing the resolution in the fast scan direction amounts to increasing the accuracy ("addressability") of the run lengths. But to be of value, the final output device must support the additional resolution, and this is often still costly. This situation is shown in FIG. 2. Notice that the "jaggies" are reduced, though still visible, at the left and right, but not the top and bottom of the circle.

An alternate approach to decreasing the size of the "jaggies" by increasing the resolution is to reduce their visibility, see FIG. 3. One way to do this is to calculate by some means the fractional portion of each edge pixel that would be inside the ideal mathematical shape 14, and set the color of that pixel to a blend composed of the color of the text or graphic and the color of the background adjacent to the edge. The output device must be able to render gray intermediate tones by some means for this method to be effective.

A number of approaches in the prior art have been taken to make the calculation of the intermediate gray tone. One is to actually produce pixels at a higher integer multiple of the output device's resolution, and treat them as sub-pixels of the device's pixels. The needed blend value can then be calculated by comparing the number of high resolution sub-pixels inside the mathematical edge and with the number outside. The approach saves the cost of increased resolution in the output apparatus, but incurs all the cost in processing time and memory associated with the rasterization process. This approach is illustrated in FIG. 3.

One commercial example of this approach is a printing system that rasterizes at increased resolution (1600×1600 rather than the nominal 400×400) and then averages the resulting 16 pixels to produce pixels at 400×400, but with gray values at the edges. The time to do this is significant, especially the time spent producing the extra scanlines.

In the fast-scan direction, the increased time to produce the higher resolution is minimal if run-length encoding is used, as described previously. This run-length-based fast-scan anti-aliasing is effective in reducing the visibility of "jaggies" nearly perpendicular in angle (greater than 45 degrees) to the fast-scan direction. The processing time and apparatus cost can be further controlled if inherently sampled image data, as distinct from synthetic graphics or text, are treated separately and not converted to the higher resolution. This subject is treated in U.S. Pat. No. RE35657, which is hereby incorporated herein, and its references. However, a method is needed to reduce the visibility of "jaggies" within 45 degrees in angle to the fast-scan direction.

SUMMARY OF THE INVENTION

An improved method of reducing jaggies at lower cost is to generate gray pixels at the ends of pixel runs in the horizontal direction directly from the run length compressed text, to produce blurred edges. A run-based approach can take advantage of two characteristics of run-length encoding to greatly reduce the processing required. First, gray pixels on near-horizontal edges (up to 45°) can be produced by determining where the edge is, and by estimating the slope on the basis of the lengths of adjacent runs. Using this information, numbers of gray pixels can be printed in increasing or decreasing levels of darkness on each side of the edge to blur the jaggedness.

Secondly, higher resolution in the fast scan direction only of the type used in the prior (which produces no additional runs, only more accurate boundaries) can produce gray pixels in near vertical edges (down to 45°). In combination, these two approaches, when coupled to a RIP (raster input processor) that directly produces run-length encodings, makes the cost of the anti-aliasing process very low, and not resolution dependent.

BRIEF DESCRIPTION OF THE DRAWINGS

FIG. 7 is a more detailed view of a transition.

DETAILED DESCRIPTION OF THE INVENTION

Figure 5:
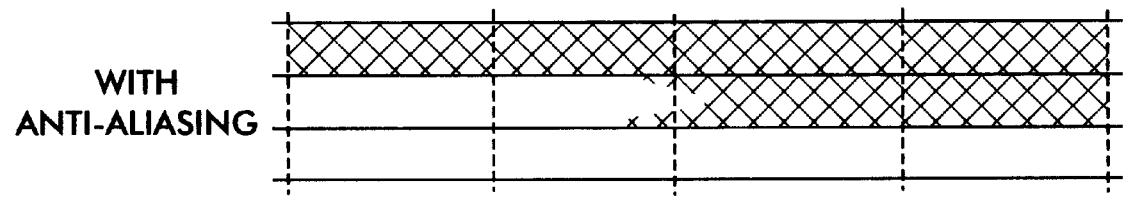
FIG. 5 is the three scan lines of FIG. 4 with the center transition blurred.
Figure 6:
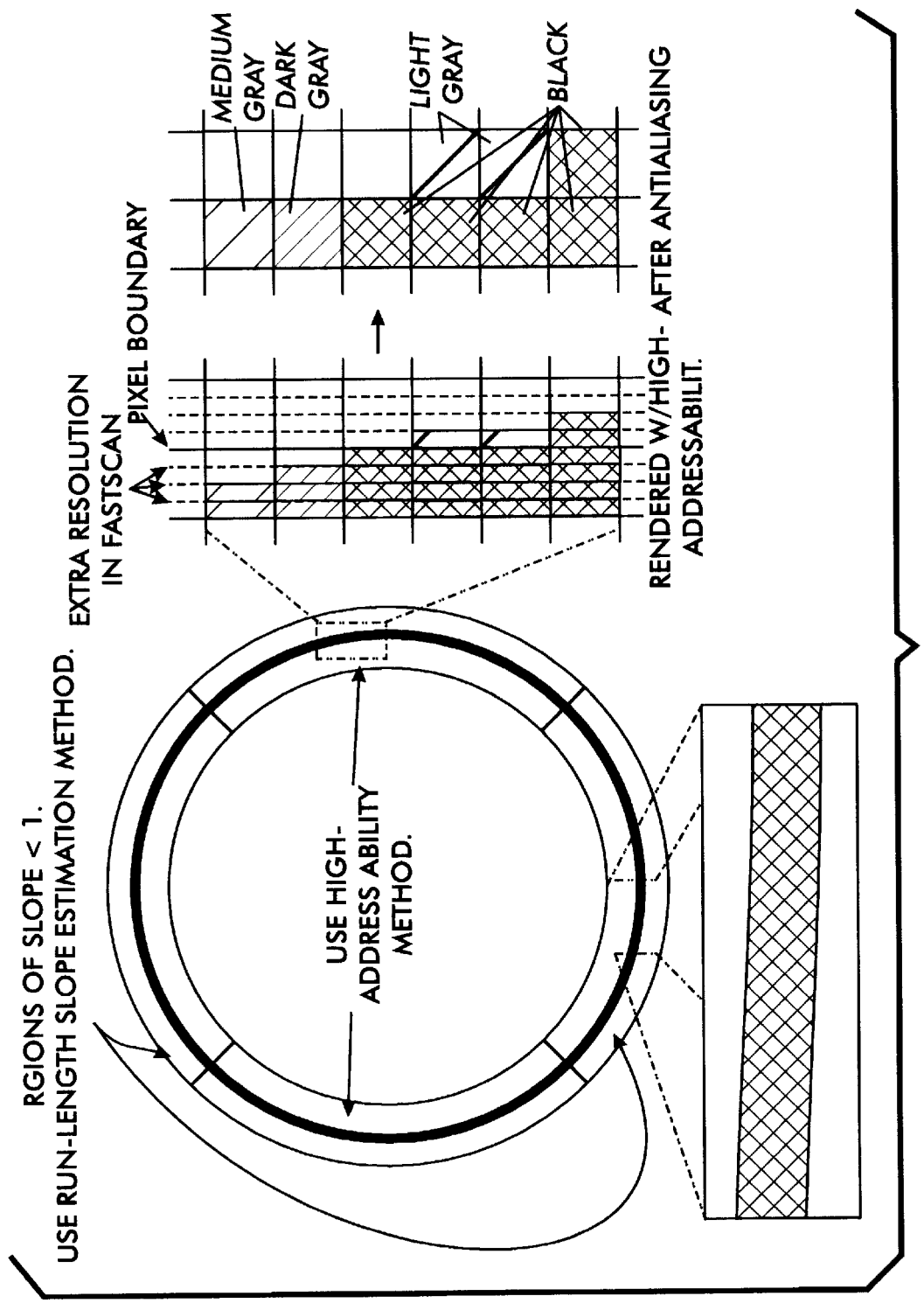
FIG. 6 is an overview of the entire anti-aliasing process.

As shown in FIG. 6, for edges that are close to horizontal, as is the case at the top and bottom of the large circle shown, the visual effect of the steps can be reduced by blurring the vertical edges of the steps, as shown in FIG. 5. This is shown as a numerical example in FIG. 7. Assume that all of the scans are run length encoded, and that all start at a segment boundary 11. As shown, the first scan is 10 black pixels long, the second is 30 black pixels long and the third is 40 black pixels long. The three run lengths here would then be 10, 30 and 40. To soften the step, and in accordance with this invention, the two areas labeled G (gray) are printed or displayed in gray rather than white or black. One way of doing this is to determine the mid points between transitions. Thus, there would be a mid point of 20 between the transitions on the first and second lines, (between 10 and 30) and a mid point of 35 between the second and third lines (between 30 and 40). Therefore, the total area between these two mid points, the two areas labeled G, would be gray. A further improvement would be to vary the gray smoothly from dark gray at position 21 to light gray at position 34. This would reduce the visual appearance of steps. For horizontal edges that are closer to 45°, the same procedure could be used, over a shorter horizontal distance.

This system can also be used for any color. For example, if the pixels to the left of the transitions are green and to the right are blue, the transitional pixels could be mostly blue with a bit of green at position 21, and mostly green with a bit of blue at position 34.

This low cost solution for nearly horizontal edges can now be used with extra resolution for near vertical edges to complete a low cost solution for all character edges. This is done by going back to original page description language, which describes the circle of FIG. 6 in mathematical terms. It would be a simple matter for the terminal to convert the current run length into a number of sub pixels rather than round off to a number of pixels. Six such extra resolution scans are shown to the right of the circle. Then, for a numerical example, if a pixel contains one ON sub pixel, it will be printed or displayed as light gray, if a pixel contains two ON sub pixels it will be displayed as medium gray, and if a pixel contains three ON sub pixels if will be displayed as dark gray. The step is now obscured, as shown in FIG. 6 as "after anti-aliasing". These two processes are computationally simple, do not create new scanlines, and therefore are not costly in either time or hardware.

Figure 1:
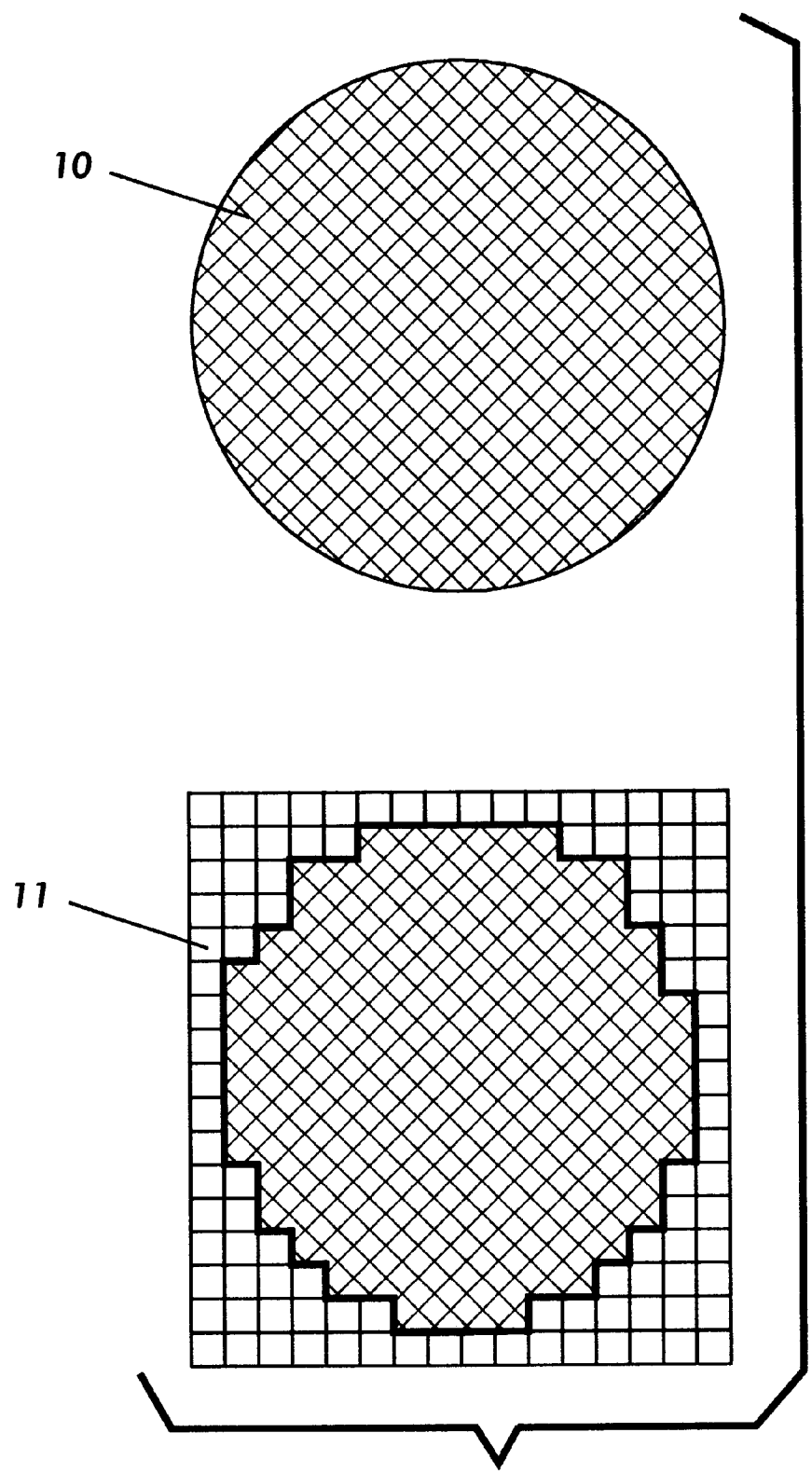
FIG. 1 is a drawing showing an ideal circle and an approximation of a circle after rasterizing, with "jaggies" visible.
Figure 2:
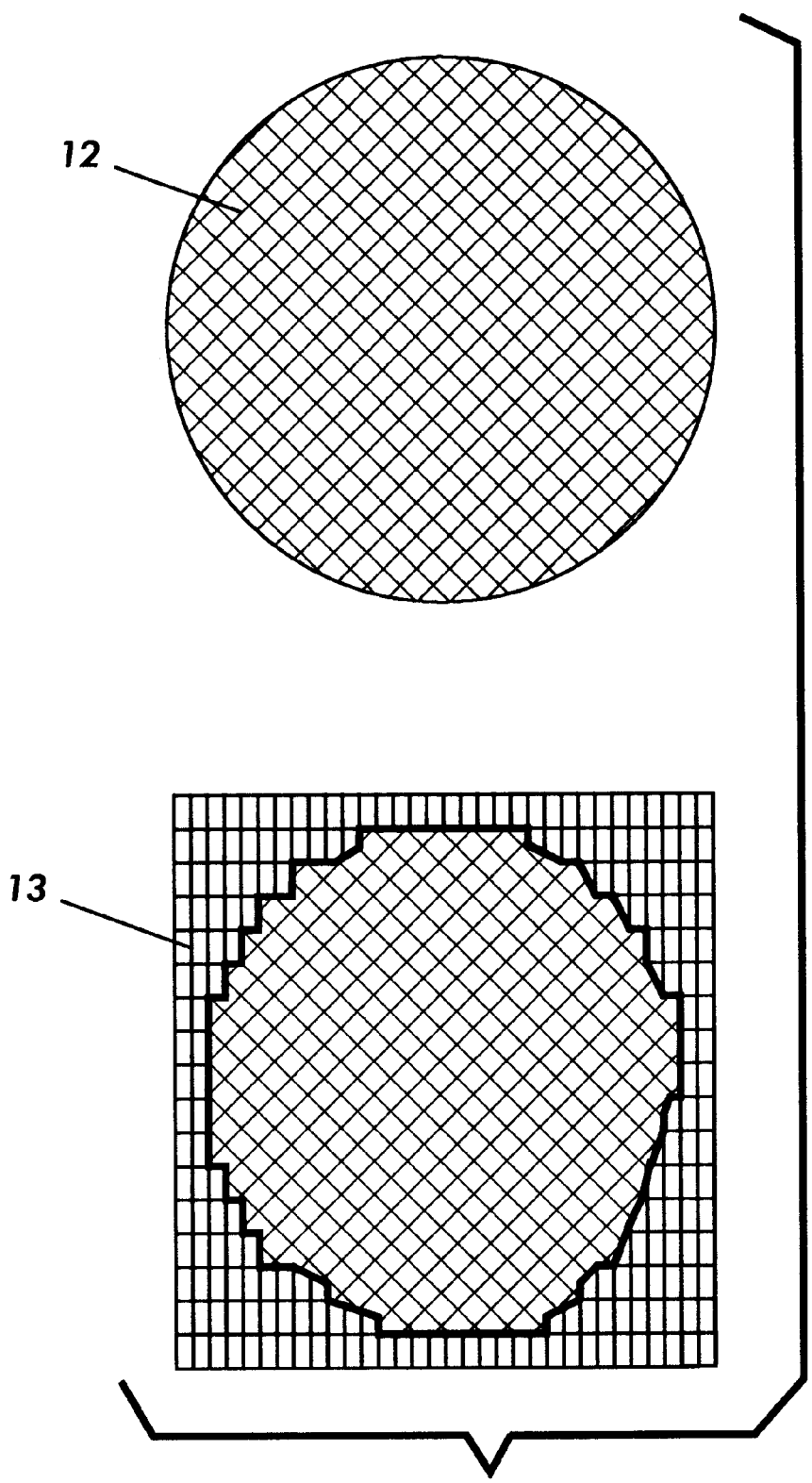
FIG. 2 is a drawing showing an ideal circle and an approximation using "high addressability" where "jaggies" are less visible on the left and right sides of the approximated circle than in FIG. 1.
Figure 3:
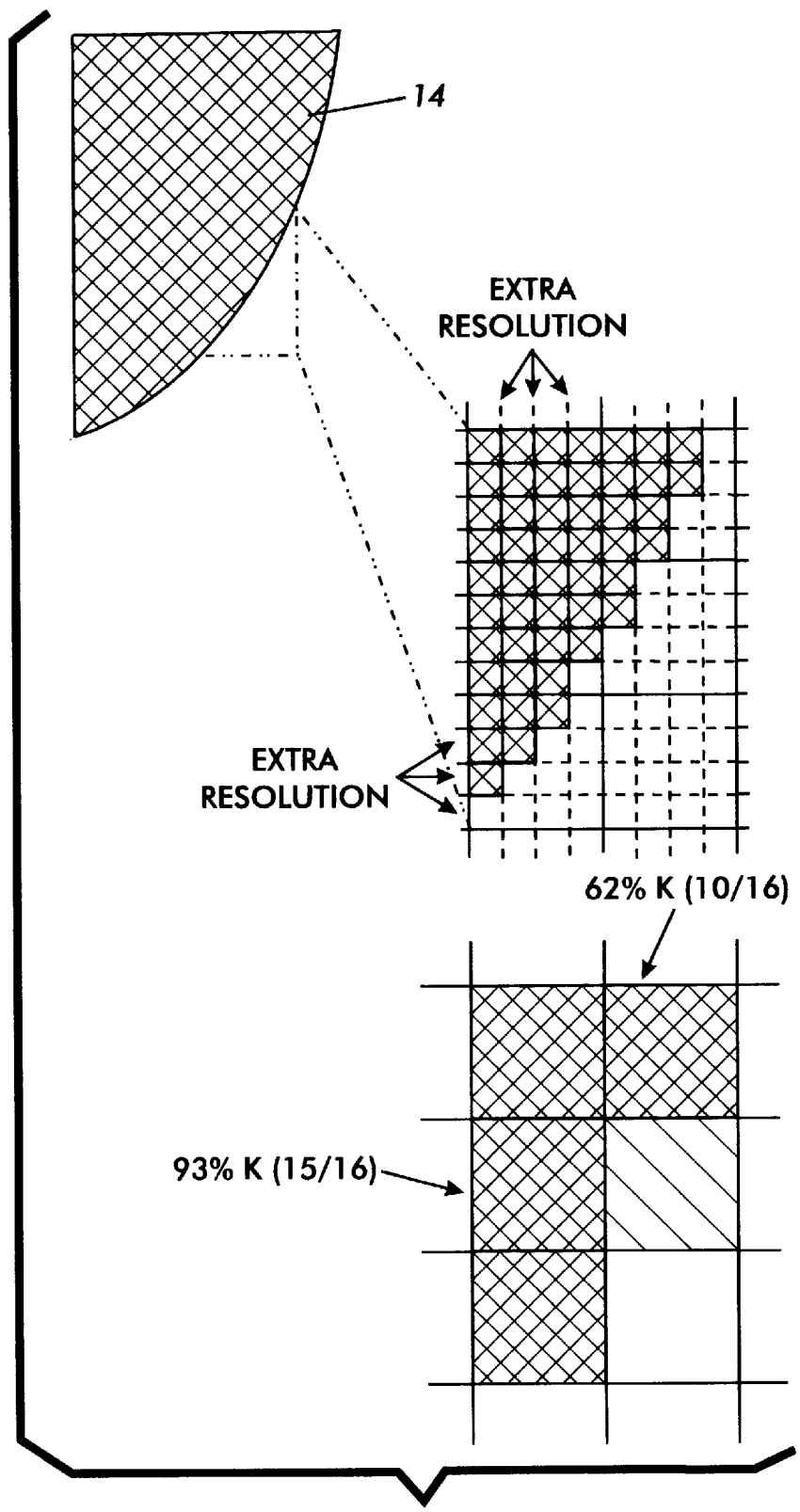
FIG. 3 is a diagram showing a portion of an ideal circle, rasterized into sub-pixels at four times the output device's resolution in each direction, and then averaged to produce pixels with one of 17 gray levels (including white) ranging from 0/16 to 16/16.
Figure 4:
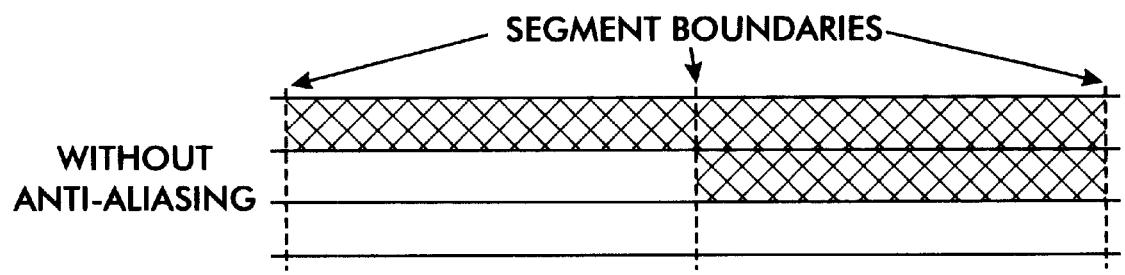
FIG. 4 is it diagram showing two adjacent segments of three scan lines in which the center scan line has a transition from white to black, each segment having a number of pixels.

In some cases while rasterizing text or graphical objects into sub-pixels at increased fast-scan resolution and producing gray pixel values, those pixels, which are represented as short runs in run-length encoded form, obscure the transition from one white to black described in FIG. 4. To resolve the situation, the one-pixel runs can be tagged as "edge" runs and ignored for purposes of detecting the condition of an edge transition.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

A software embodiment of the invention follows:

Patent Application
Attorney Docket No. D/97639
Express Mail Label No. EH906867751US

```
static void PerSegments (Data d, OORScanline_Environ *env)

{ u_int idx[3];     /*   d->scans[i].runs->runs[idx[i]]    is
current run */

/* on ith scan in window */

/* We apply the AntiAlias proc IFF the current segment
(call it run1)

* does NOT match the next segment (call it next1) on the
scanline,

* and:

*    run1 matches exactly one of its neighbors above or
below, and

*    next1 matches the other neighbor, and next1 also
matches the

*    neighbor above or below that run1 didn't match, as
well as

*    exactly one of *its* neighbors.  run1 must match the
other
```

```
*       neighbor of next1.  Thus we have a total of two
colors,

*       with a segment boundary on our scanline.

* Put another way, this means:

*       d->scans[0].runs->runs[idx[0]] points to a run in
scan 0. That

*       run extends over both the current and the next
segments, and

*       matches exactly one of the runs in scanline 1.

*       d->scans[2].runs->runs[idx[2]] points to a run in
scan 2. It

*       also extends over both the current and the next
segments, and

*       matches the run in scanline 1 not matched in scan 0.

*/ u_int i;

u_int fMin, fMax = 0, fMax2, fMaxNeighbors;

/* In the loop below, [fMin .. fMax) is segment boundary
*/ idx[0] = 0; idx[1] = 0; idx[2] = 0;   /* init for beg of
scanline */ d->fEmitted = 0;                  /* initialize */
```

Patent Application
Attorney Docket No. D/97639
Express Mail Label No. EH906867751US

```
/* A "segment" is the largest [fMin .. fMax) with no run transitions
 * in any of the three scans we are examining */ while (d->fEmitted < env->under->rc.size.f)
{
   FlatRun *run1 = &(d->scans[1].runs->runs[idx[1]]);
   FlatRun *next1 = &(d->scans[1].runs->runs[idx[1]+1]);
   fMin = fMax;     /* right edge of previous segment is left edge of
                    * current segment */
    fMaxNeighbors = MIN(d->scans[0].runs->runs[idx[0]].max,
d->scans[2].runs->runs[idx[2]].max);

fMax   =  MIN(d->scans[1].runs->runs[idx[1]].max,
fMaxNeighbors);

/* We don't want the presence of previously computed fEdges to
       * prevent us from seeing potential sEdge situations, so capture
       * the fEdge, flag its presence, and get the following run into
```

Patent Application
Attorney Docket No. D/97639
Express Mail Label No. EH906867751US

```
    * next1.

*/ if (next1->tags.tag0.hint == fEdge)

{

/* Hold onto this run and get another next1 run to
consider.

* If we don't detect an sEdge condition, we don't
emit any part

* of next1 anyway.

*/ next1 = &(d->scans[1].runs->runs[idx[1]+2]);

} fMax2 = MIN(next1->max, fMaxNeighbors);

/* Here, we need to determine if the current segment
could satisfy

* the opportunity requirements, if coupled with the
next segment

* to the right.

*/ if ( d->scans[0].runs->runs[idx[0]].max > fMax && d->scans[2].runs->runs[idx[2]].max > fMax &&
```

9

Patent Application
Attorney Docket No. D/97639
Express Mail Label No. EH906867751US

```
            /* scan 1 *must* cause segment break */ fMax - fMin >= d->minRunLengthToExploit &&

/* this run is long enough */ fMax2 - fMax >= d->minRunLengthToExploit

/* next run is long enough */

)

{ u_int step;

u_int fStart = (fMax+fMin)/2;

u_int fEnd = (fMax+fMax2)/2;

u_int nSteps;

int colorDiff;

/* here we have to handle the four possible cases for
    sampled

* image data in either the current or next run.

*/ if (!run1->tags.tag0.useSampled)

{ if (!next1->tags.tag0.useSampled)

{   /* case 0:  neither run is sampled */ if (
```

```
                run1->c0 != next1->c0 &&

/* this run and next have diff
colors */

(

/* check for matching scan above, and not
matching scan

* below */

(run1->c0 == d->scans[0].runs->runs[idx[0]].c0

&& next1->c0 == d->scans[2].runs-
>runs[idx[2]].c0)

/* check for matching scan below, and not
matching scan

* above */

|| (run1->c0 == d->scans[2].runs-
>runs[idx[2]].c0

&& next1->c0 == d->scans[0].runs-
>runs[idx[0]].c0)

)

)

{

Hint myHint = (colorDiff > d->edgeThreshold) ?
sEdge : run1->tags.tag0.hint;
```

Patent Application
Attorney Docket No. D/97639
Express Mail Label No. EH906867751US

```
        /* emit the min half of the run.  If the previous
segment
         * caused that half to have been emitted already,
EmitRun
         * will do nothing.
         */
        EmitRun(d, env, run1, fStart, run1->c0, myHint,
DONT_FORCE_SAMPLED);

colorDiff = ColorDifference(run1->c0, next1->c0);

nSteps = MIN(d->nSteps, fMax-fStart);

for (step = 1; step < nSteps; step++)

{

EmitRun( d, env, run1, ((nSteps-step)*fStart + step*fMax)/nSteps,

ColorMixer(run1->c0,   next1->c0,   nSteps*2-step,
step), myHint,

DONT_FORCE_SAMPLED
```

```
      );

} nSteps = MIN(d->nSteps, fEnd-fMax);

for (step = 0; step < nSteps; step++)

{

EmitRun( d, env, next1, ((nSteps-step)*fMax + step*fEnd)/nSteps,

ColorMixer(run1->c0,    next1->c0,    nSteps-step,
  step+nSteps), myHint,

DONT_FORCE_SAMPLED

);

}

} else /* not an edge */

{ colorDiff = ColorDifference(
```

Patent Application
Attorney Docket No. D/97639
Express Mail Label No. EH906867751US

```
        /* did a big enough color change happen across
this edge? */ d->scans[0].runs->runs[idx[0]].c0, d->scans[2].runs->runs[idx[2]].c0

);

EmitRun( d, env, run1, fMax, run1->c0, (colorDiff > d->edgeThreshold) ?

sEdge :

run1->tags.tag0.hint,

DONT_FORCE_SAMPLED);

}

}       /* end   of   case   0:   "if   (!next1-
>tags.tag0.useSampled)" */ else

{ /* case 1: only the "next1" run is sampled */
      if (
```

Patent Application
Attorney Docket No. D/97639
Express Mail Label No. EH906867751US

```
            /* check for matching scan above, and not
matching scan

* below */

(run1->c0 == d->scans[0].runs->runs[idx[0]].c0

&&          d->scans[2].runs-
>runs[idx[2]].tags.tag0.useSampled)

/* check for matching scan below, and not
matching

* scan above */

|| (run1->c0 == d->scans[2].runs->runs[idx[2]].c0

&&          d->scans[0].runs-
>runs[idx[0]].tags.tag0.useSampled)

)

{

ColorModel_Color sample;

Imager_IntVEC index, srcindex;

u_int sep;

u_int nPixels;

/* emit the min half of the run.  If the previous
segment

* caused that half to have been emitted already,
EmitRun

* will do nothing.
```

15

Patent Application
Attorney Docket No. D/97639
Express Mail Label No. EH906867751US

```
        */

EmitRun( d, env, run1, fStart, run1->c0, run1->tags.tag0.hint,

DONT_FORCE_SAMPLED);

/* loop through the last half of run1, blending
run1's c0
         * color into sample pixel from the scanline
either above or
         * below run1.  (We know only one of them is
sampled.)
         */ index.s = d->scans[1].s;

srcindex.s =

(d->scans[0].runs-
>runs[idx[0]].tags.tag0.useSampled) ?

d->scans[0].s :

d->scans[2].s;
```

16

Patent Application
Attorney Docket No. D/97639
Express Mail Label No. EH906867751US

```
        index.f = srcindex.f = fStart;

nPixels = (fMax - fStart);

for (step = 0; step < nPixels; step++, index.f++,
srcindex.f++)

{

/* When we support interleaved pixel rastermaps,
replace

* the for(sep) loop with a simple pixel access;
likewise

* for the Put that follows the color mixing */ for (sep = 0; sep < 4; sep++)

ColorModel_pixel(sample,         sep)          =
ImagerSample_Get(env->under->image->sampleMaps[sep],
srcindex);

sample = ColorMixer(run1->c0, sample, nPixels*2-
step, step);

for (sep = 0; sep < 4; sep++)

ImagerSample_Put(env->under->image-
>sampleMaps[sep],   index,   ColorModel_pixel(sample,   sep),
Imager_nullFunction);

} if (nPixels > 0) EmitRun(d, env, run1, fMax, 0,
Hints_sampled, TRUE);
```

Patent Application
Attorney Docket No. D/97639
Express Mail Label No. EH906867751US

```
        /* loop through the first half of next1, blending
run1's c0

* color into next1's sampled pixels.  This takes
us to fEnd,

* halfway through next1.

*/ index.f = fMax;

nPixels = (fEnd - fMax);

for (step = 0; step < nPixels; step++, index.f++)

{

/* When we support interleaved pixel rastermaps,
replace the

* for(sep) loop with a simple pixel access;
likewise for

* the Put that follows the color mixing */ for (sep = 0; sep < 4; sep++)

ColorModel_pixel(sample,           sep)           =
ImagerSample_Get(env->under->image->sampleMaps[sep], index);

sample = ColorMixer(run1->c0, sample, nPixels-
step, step+nPixels);

for (sep = 0; sep < 4; sep++)

ImagerSample_Put(env->under->image-
>sampleMaps[sep],   index,   ColorModel_pixel(sample,   sep),
Imager_nullFunction);
```

Patent Application
Attorney Docket No. D/97639
Express Mail Label No. EH906867751US

```
        } if (nPixels > 0) EmitRun(d, env, next1, fEnd, 0,
Hints_sampled, FORCE_SAMPLED);

} else /* not an edge */

{

EmitRun(d,   env,   run1,   fMax,   run1->c0,   run1-
>tags.tag0.hint, DONT_FORCE_SAMPLED);

}

}  /* end of case 1 */

}    /* end of if (!run1->tags.tag0.useSampled) */ else

{ if (!next1->tags.tag0.useSampled)

{   /* case 2:  only the first run ("run1") is sampled
*/ if (

/*  check  for  matching  scan  above,  and  not
matching scan

* below */

(d->scans[0].runs-
>runs[idx[0]].tags.tag0.useSampled

&&   next1->c0   ==   d->scans[2].runs-
>runs[idx[2]].c0)
```

```
            /* check for matching scan below, and not
matching scan

* above */

||    (d->scans[2].runs-
>runs[idx[2]].tags.tag0.useSampled

&& next1->c0 == d->scans[0].runs-
>runs[idx[0]].c0)

)

{

ColorModel_Color sample;

Imager_IntVEC index, srcindex;

NAT sep;

NAT nPixels;

/* emit the min half of the run.  If the previous
segment

* caused that half to have been emitted already,
EmitRun will

* do nothing.

*/

EmitRun(d, env, run1, fStart, run1->c0, run1-
>tags.tag0.hint, DONT_FORCE_SAMPLED);
```

Patent Application
Attorney Docket No. D/97639
Express Mail Label No. EH906867751US

```
        /* loop through the last half of run1, blending
next1's c0

* color into run1's sampled pixels.  This takes
us to the

* run boundary, fMax.

*/ index.s = d->scans[1].s;

index.f = fStart;

nPixels = (fMax - fStart);

for (step = 0; step < nPixels; step++, index.f++)

{

/* When we support interleaved pixel rastermaps,
replace the

* for(sep) loop with a simple pixel access;
likewise for

* the Put that follows the color mixing */ for (sep = 0; sep < 4; sep++)

ColorModel_pixel(sample,           sep)         =
ImagerSample_Get(env->under->image->sampleMaps[sep], index);

sample = ColorMixer(sample, next1->c0, nPixels*2-
step, step);

for (sep = 0; sep < 4; sep++)
```

Patent Application
Attorney Docket No. D/97639
Express Mail Label No. EH906867751US

```
        ImagerSample_Put(env->under->image-
>sampleMaps[sep],   index,   ColorModel_pixel(sample,   sep),
Imager_nullFunction);

} if  (nPixels > 0) EmitRun(d,  env,  run1,  fMax,  0,
Hints_sampled, FORCE_SAMPLED);

/* loop through the first half of next1, blending
next1's c0

* color  into  sample  pixels  from  the  scanline
either above or

* below next1.   (We know only one of them is
sampled.)

*/ srcindex.s     =      (d->scans[0].runs-
>runs[idx[0]].tags.tag0.useSampled)   ?   d->scans[0].s   :   d-
>scans[2].s;

index.f = srcindex.f = fMax;

nPixels = (fEnd - fMax);

for (step = 0; step < nPixels; step++, index.f++,
srcindex.f++)

{

/* When we support interleaved pixel rastermaps,
replace

* the for(sep) loop with a simple pixel access;
likewise
```

Patent Application
Attorney Docket No. D/97639
Express Mail Label No. EH906867751US

```
     * for the Put that follows the color mixing */ for (sep = 0; sep < 4; sep++)

ColorModel_pixel(sample,         sep)              =
ImagerSample_Get(env->under->image->sampleMaps[sep],
srcindex);

sample = ColorMixer(sample, next1->c0, nPixels-
step, step+nPixels);

for (sep = 0; sep < 4; sep++)

ImagerSample_Put(env->under->image-
>sampleMaps[sep],   index,   ColorModel_pixel(sample,   sep),
Imager_nullFunction);

} if (nPixels > 0) EmitRun(d, env, next1, fEnd, 0,
Hints_sampled, FORCE_SAMPLED);

} else /* not an edge */

{

EmitRun(d,  env,  run1,  fMax,  run1->c0,  run1-
>tags.tag0.hint, DONT_FORCE_SAMPLED);

}

}     /*    end    of    case    2:    "if    (!next1-
>tags.tag0.useSampled)" */ else

{
```

Patent Application
Attorney Docket No. D/97639
Express Mail Label No. EH906867751US

```
    {  /* case 3: both runs are sampled. Emit only the first run,
     *           and don't bother with AA for F. */

EmitRun(d, env, run1, fMax, run1->c0, run1->tags.tag0.hint, DONT_FORCE_SAMPLED);

} /* end of case 3 */

}

}

} else /* didn't meet our AA conditions, so just emit */

{

EmitRun(d, env, run1, fMax, run1->c0, run1->tags.tag0.hint, DONT_FORCE_SAMPLED);

}

/* Here, we've finished doing everything needed for this segment.
     * On to the next! */ for (i=0; i<3; i++) if (d->scans[i].runs->runs[idx[i]].max == fMax) idx[i]++;

} /* end while */
}
```

What is claimed is:

1. A method of anti-aliasing along an edge of pixels that has a slope of less than 1 from the fast scan direction, the edge being the transition between a first and second color, comprising the steps of:

generating values of run lengths of one color for a first, a second and a third consecutive scan, the ends of the lengths being defined in the fast scan direction as points A, B and C, determining a fast scan direction point D between A and B, and point E between B and C, calculating values of color that vary continuously from the first to the second color, and using the calculated values for the pixels between points D and E.

2. The method of claim 1 wherein point D is equidistant from points A and B and point E is equidistant from points B and C.

3. The method of claim 1 wherein, for an edge of pixels that has a slope of more than 1 from the fast scan direction, using high addressability to generate a number of sub pixels for each pixel and then averaging within each pixel to form a color intermediate between those on each side of the edge.

4. The method of claim 3 wherein, for edge pixels generated using high addressability blending, such pixels are tagged as "edge" and ignored in the steps of claim 1.

5. The method of claim 1 wherein one of the runs of the transition has a tag indicating that sampled image data from a separate source is to be used in place of a constant color, and the steps of claim 1 are modified such that the calculation of the continuously varying color takes into account the sampled image pixel value for each pixel between points D and E.

6. The method of claim 5 wherein, for an edge of pixels of constant color that has a slope of more than 1 from the fast scan direction, uses high addressability to produce intermediate colors as in claim 3, but where the substituted sampled image data does no use high addressability, but remains at the resolution of the output device.

* * * * *